United States Patent
Terada et al.

(10) Patent No.: US 10,853,692 B2
(45) Date of Patent: Dec. 1, 2020

(54) VICINITY SUPERVISING DEVICE AND METHOD FOR SUPERVISING VICINITY OF VEHICLE

(71) Applicants: DENSO CORPORATION, Kariya (JP); TOYOTA JIDOSHA KABUSHIKI KAISHA, Toyota (JP)

(72) Inventors: Toshihiko Terada, Kariya (JP); Naohide Uchida, Numazu (JP); Hirotake Ishigami, Okazaki (JP); Hiroaki Ito, Toyota (JP)

(73) Assignees: DENSO CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 128 days.

(21) Appl. No.: 16/136,891

(22) Filed: Sep. 20, 2018

(65) Prior Publication Data

US 2019/0095761 A1 Mar. 28, 2019

(30) Foreign Application Priority Data

Sep. 22, 2017 (JP) .................. 2017-183037

(51) Int. Cl.
  *G06K 9/00* (2006.01)
  *G06K 9/62* (2006.01)
  (Continued)

(52) U.S. Cl.
  CPC ....... *G06K 9/6262* (2013.01); *G06K 9/00791* (2013.01); *G06T 7/55* (2017.01); *G06T 7/80* (2017.01); *G06T 7/97* (2017.01); *G06K 2209/40* (2013.01); *G06T 2207/20076* (2013.01); *G06T 2207/30248* (2013.01); *G06T 2207/30252* (2013.01)

(58) Field of Classification Search
  CPC ............. G06K 9/6262; G06K 9/00791; G06K 2209/40; G06T 7/80; G06T 7/55; G06T 7/97; G06T 2207/20076; G06T 2207/30248; G06T 2207/30252
  See application file for complete search history.

(56) References Cited

U.S. PATENT DOCUMENTS

2014/0320612 A1* 10/2014 Kakegawa ............... G06T 7/593
  348/47
2017/0217394 A1* 8/2017 Shima ..................... B60R 21/00
(Continued)

FOREIGN PATENT DOCUMENTS

JP  2009-239485 A  10/2009
JP  5172422 B2  3/2013

*Primary Examiner* — Ping Y Hsieh
(74) *Attorney, Agent, or Firm* — Maschoff Brennan

(57) ABSTRACT

A vicinity supervising device includes an image capturing unit that captures a plurality of images in which an object is simultaneously captured from different locations; a matching processing unit that calculates a parallax point and a reliability point, the parallax point being the number of pixel regions from which a parallax is calculated among a plurality of pixel regions divided by the plurality of images, and the reliability point being the number of pixel regions having high recognition reliability among the plurality of pixel regions; and an evaluation unit that evaluates, based on the parallax point and the reliability point, an imaging environment where the plurality of images are captured.

6 Claims, 3 Drawing Sheets

(51) Int. Cl.
  *G06T 7/00* (2017.01)
  *G06T 7/80* (2017.01)
  *G06T 7/55* (2017.01)

(56) References Cited

U.S. PATENT DOCUMENTS

2017/0262734 A1* 9/2017 Nakata ............... G06K 9/00979
2018/0324406 A1* 11/2018 Koishi .................... G06T 1/00
2019/0180463 A1* 6/2019 Tsunashima ....... G06K 9/00805

* cited by examiner

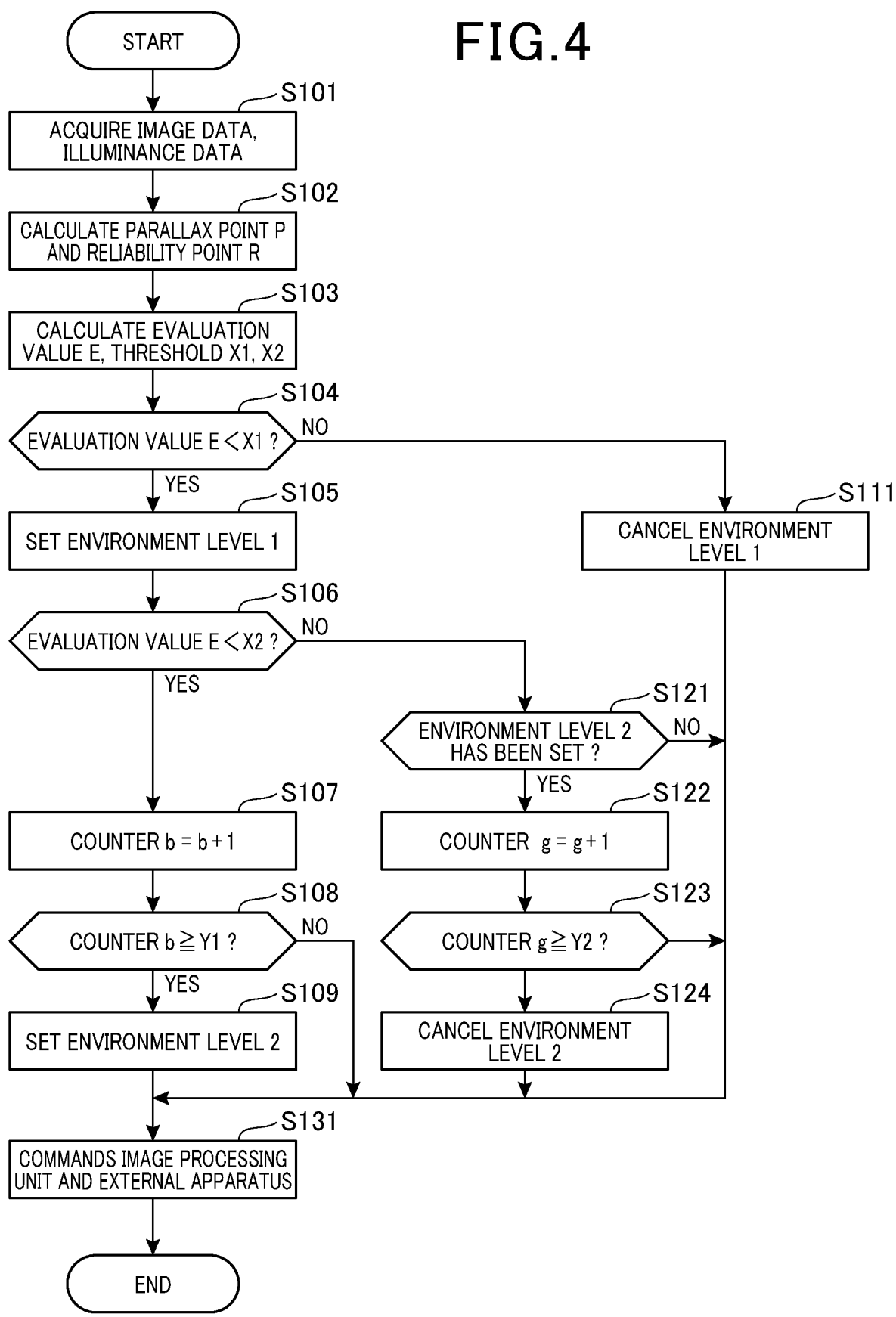

VICINITY SUPERVISING DEVICE AND METHOD FOR SUPERVISING VICINITY OF VEHICLE

CROSS-REFERENCE TO RELATED APPLICATION

This application is based on and claims the benefit of priority from earlier Japanese Patent Application No. 2017-183037 filed Sep. 22, 2017, the description of which is incorporated herein by reference.

BACKGROUND

Technical Field

The present disclosure relates to a vicinity supervising device and a vicinity supervising method which supervise vicinity of a vehicle by using a plurality of images in which an object is captured from different positions.

Description of the Related Art

For example, Japanese Patent Number 5172422 discloses a vehicle supervising device which simultaneously acquires a plurality of images of an object in the vicinity of a vehicle from different positions using imaging devices such as a stereo camera. In the vehicle supervising device, a parallax is calculated from the plurality of images to detect a position of the object, thereby supervising a vicinity of the vehicle. To detect the object, a stereo matching technique is used in which correlated pixels are detected between two images captured from different positions, whereby a parallax value is calculated for each pixel.

In the case where an environment for capturing images (i.e., imaging environment) is deteriorated, mis-matching is likely to occur in the stereo matching process so that a malfunction or a failure may occur in the vicinity supervising device. Hence, control commands or the like may not be transmitted correctly to the vehicle control system. In this respect, a technique has been developed in which control commands or the like for the vehicle transmitted by the vicinity supervising device are disabled when detecting a deterioration of the imaging environment.

On the other hand, in the case where a degree of deterioration of the imaging environment is not so serious, the vicinity supervising device may preferably continue to perform a vehicle control. Hence, for example, according to the above-mentioned patent literature, the degree of deterioration of the imaging environment is divided into three levels based on the captured image for evaluating the degree of the deterioration, and a driving support control is terminated when a pixel region having the worst deterioration degree is detected or a certain number or more of pixel regions each having intermediate deterioration degree are detected. Meanwhile, when the deterioration degree of the imaging environment is determined as intermediate, the driving support control is not terminated until the point number of image regions becomes insufficient whereupon the image recognition performance is limited, thereby continuing the driving support control.

For example, when an obstacle such as a windshield wiper is captured in the image, since luminance of a pixel region covered by the obstacle is significantly lowered, but luminance of a pixel region not covered by the obstacle is not lowered, pixel regions which are not covered can be used to secure parallax points, whereby vicinity environment may be sufficiently recognized. According to the above-mentioned patent literature, even in a case where some pixel regions have significantly low luminance, if the degree of the deterioration of the part of the pixel regions is evaluated as the worst level deterioration, the driving support control is immediately terminated. Therefore, the driving support control is sometimes terminated even in a case where the vicinity environment is sufficiently recognized so that termination of the driving support control is not necessary.

SUMMARY

The present disclosure has been achieved in light of the above-described circumstances and provides vicinity supervision of a vehicle which suppresses undesired termination of image processing or vehicle control executed by the vicinity supervising process when a part of image is covered by an obstacle such as a windshield wiper.

The present disclosure provides a vicinity supervising device provided with an image capturing unit that captures a plurality of images in which an object is simultaneously captured from different locations; a matching processing unit that calculates a parallax point and a reliability point, the parallax point being the number of pixel regions from which a parallax is calculated among a plurality of pixel regions divided by the plurality of images, and the reliability point being the number of pixel regions having high recognition reliability among the plurality of pixel regions; and an evaluation unit that evaluates, based on the parallax point and the reliability point, an imaging environment where the plurality of images are captured.

According to the vicinity supervising device of the present disclosure, the evaluation value for evaluating the imaging environment is calculated based on the reliability point and the parallax point. For example, in the case where a luminance significantly decreases in a part of pixel regions when an obstacle is captured, since the evaluation value is calculated based on both of the reliability point and the parallax point having smaller values, it is avoided that the evaluation value significantly changes. Even in a case where the luminance significantly decreases at a part of pixel regions but the vicinity environment can be recognized, excessive change of the evaluation value can be avoided in which the vicinity supervising device unnecessarily terminates an image processing or a vehicle control.

The present disclosure also provides a method for supervising a vicinity of a vehicle which is accomplished by the above-described vicinity supervising device. The method includes an image capturing step that captures a plurality of images in which an object is simultaneously captured at different locations; a matching processing step that calculates a parallax point and a reliability point, the parallax point being the number of pixel regions from which a parallax is calculated among a plurality of pixel regions divided by the plurality of images, and the reliability point being the number of pixel regions having high recognition reliability among the plurality of pixel regions; and an evaluation step that evaluates, based on the parallax point and the reliability point, an imaging environment where the plurality of images are captured.

BRIEF DESCRIPTION OF THE DRAWINGS

In the accompanying drawings:

FIG. 4 is a flowchart showing a calculation process executed by the vicinity supervising device.

DETAILED DESCRIPTION OF THE PREFERRED EMBODIMENTS

Figure 1:
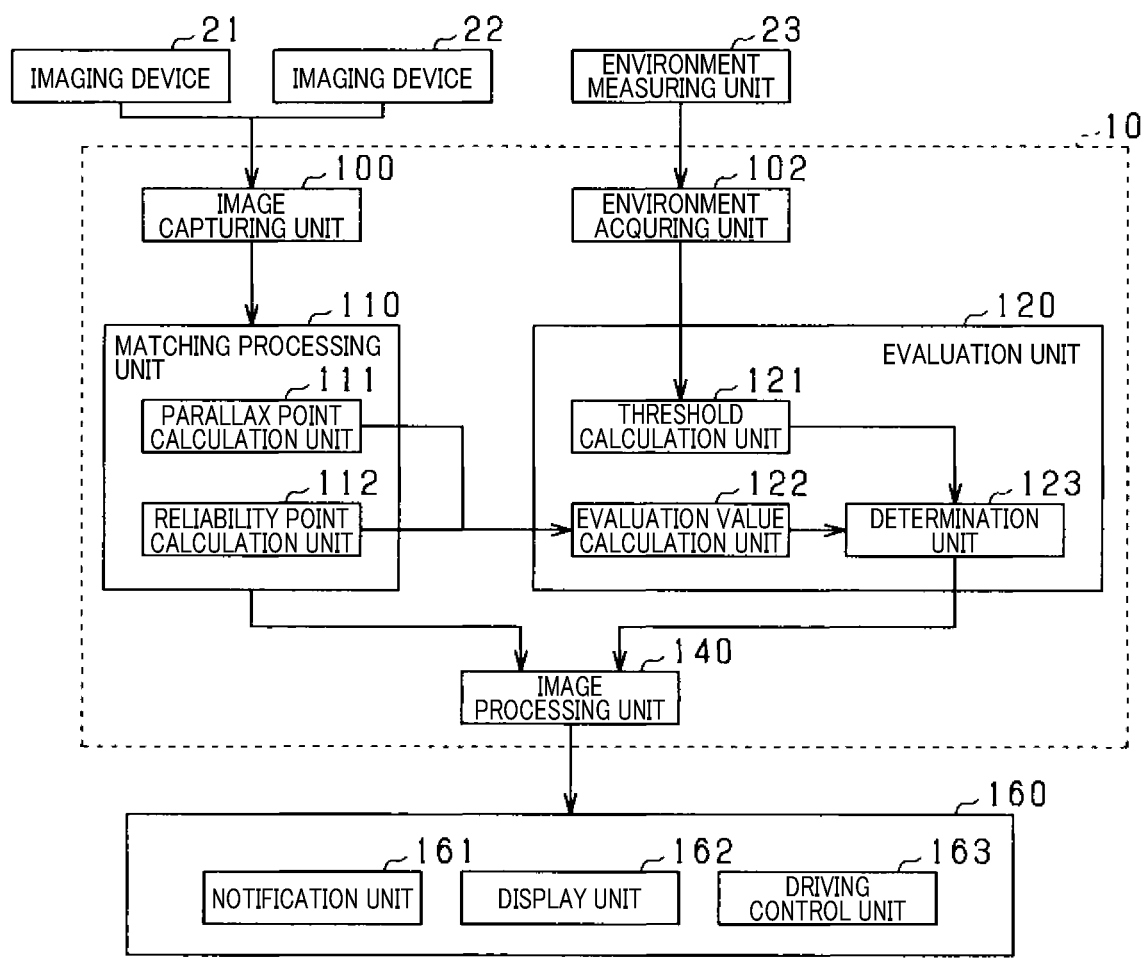
FIG. 1 is a block diagram showing a vicinity supervising device according to the embodiment of the present disclosure.

As shown in FIG. 1, a vicinity supervising device 10 according to the present embodiment is provided with an image capturing unit 100, an environment acquiring unit 102, a matching processing unit 110, an evaluation unit 120 and an image processing unit 140. The matching processing unit 110 includes a parallax point calculation unit 111 and a reliability point calculation unit 112. The evaluation unit 120 includes a threshold calculation unit 121, an evaluation value calculation unit 122 and a determination unit 123.

The vicinity supervising device 10 is configured as an electronic control unit (ECU) including an A/D (analog to digital) converter, I/O, CPU, RAM, ROM, image memory and the like, in which the CPU executes a program stored in advance to accomplish the above-mentioned respective functions. Instead of using the CPU, or together with the CPU, an FPGA (field-programmable gate array) where a digital circuit is provided therein may be included.

Signals outputted by imaging devices 21 and 22 and an environment measuring unit 23 are converted to digital signals and outputted to the CPU of the vicinity supervising device 10. The vicinity supervising device 10 performs image processing based on the input signals, and outputs image data and a control signal to an external apparatus 160 including a notification unit 161, a display unit 162 and a driving control unit 163.

The image capturing unit 100 captures images simultaneously captured by a pair of imaging devices 21 and 22. Thus, a plurality of images can be acquired in which an object is simultaneously captured by the pair of imaging devices 21 and 22 at different locations. The imaging devices 21 and 22 are configured as a stereo camera integrating image sensors such as CCD or COMS sensors or infrared camera. The imaging devices 21 and 22 are mounted to a portion behind the rear-view mirror to have a predetermined base line length in the vehicle width direction. The imaging devices 21 and 22 capture a surrounding environment including a road ahead of the own vehicle and a preceding vehicle or the like.

The imaging device 21 outputs a standard image To and the imaging device 22 outputs a reference image Tc. The imaging device 21 and the imaging device 22 are synchronized to each other, and simultaneously capture the surrounding environment at the same timing and output a pair of analog images To and Tc to the image capturing unit 100.

The environment measuring unit 23 is configured to measure an environmental condition value concerning a vicinity environment captured by the imaging devices 21 and 22. The environmental condition value measured by the environment measuring unit 23 may preferably be a condition which influences the image captured. The condition includes illuminance, temperature and humidity. According to the present embodiment, an environment measuring unit 23 provided with an illuminometer will be exemplified.

The environment measuring unit 23 measures, at a time where the imaging devices 21 and 22 are captured, an illuminance of the imaging environment, and outputs the measured illuminance to the environment acquiring unit 102 as illuminance data.

In the image capturing unit 100, the A/D converter converts the pair of analog images To and Tc received from the imaging devices 21 and 22 into digital images each having a predetermined luminance gradation and outputs them to the matching processing unit 110. The environment acquiring unit 102 acquires the luminance data measured by the environment measuring unit 23, converts the measured illuminance data into digital data and outputs them to the threshold calculation unit 121 of the evaluation unit 120.

The matching processing unit 110 performs a matching process based on a plurality of images To and Tc captured by the image capturing unit 100. The parallax point calculation unit 111 calculates the parallax point P and the reliability point calculation unit 112 calculates a reliability point R. The parallax point P and the reliability point R are outputted to the evaluation value calculation unit 122.

The parallax point calculation unit 111 divides the standard image To and the reference image Tc into predetermined pixel regions. Then, the parallax point calculation unit 111 sets, for respective pixel regions PBo of the reference image To, the epipolar line EPL corresponding to a pixel region PBo in the reference image Tc, and compares the pixel region PBo and a luminance pattern of the pixel region PBc in the reference image Tc existing on the epipolar line. For the comparison between the pixel region PBo and the pixel region PBc, an evaluation function such as SAD (sum of absolute difference), SSD (sum of squared difference) can be used for example. Note that the matching method is not limited thereto. However, an SGM (semi-global matching) method may preferably be used.

The parallax point calculation unit 111 calculates the number of pixel regions from which parallax can be calculated to be a parallax point P, among pixel regions of the standard image and the reference image Tc. Further, the parallax point calculation unit 111 calculates a parallax for each of the pixel regions from which parallax can be calculated, and outputs the parallax value, the parallax image, and the image data (captured image) acquired from the image capturing unit 100 to the image processing unit 140.

The reliability point calculation unit 112 calculates the number of pixel regions having high recognition reliability in the standard image To and the reference image Tc, to be the reliability point R. Note that high recognition reliability refers to that recognition properties of an object captured in the pixel region is high. When the recognition properties of the object are low, the reliability point R becomes small so that it is difficult to detect a pixel region in the reference image Tc which is similar to a pixel region in the standard image To to be detected. When the recognition properties of an object captured in the pixel region are high, the reliability point R becomes large so that a pixel region in the reference image Tc which is similar to an object pixel region in the standard image To is detected easily. For example, in the case where the luminance pattern of the pixel region is too high or too low, the recognition properties of the object captured in the pixel region become low so that the reliability point R becomes small.

Figure 2:
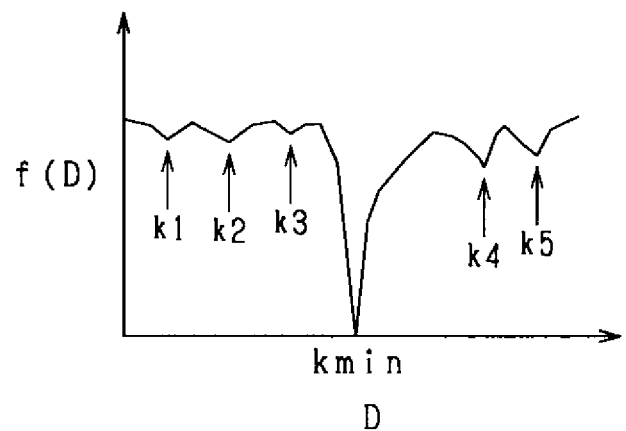
FIG. 2 is a graph showing a reliability point R.

The reliability point R can be calculated with a reliability flag exemplified in the following. First, the SGM method is used to calculate a similarity f (D) between the object pixel in the standard image To and a pixel search region in the reference image Tc. As shown in FIG. 2 where the vertical axis is defined as similarity f (D) and the horizontal axis is defined as a parallax value D, one minimum value (i.e., kmin in FIG. 2) and a plurality of local minimum values (i.e., k1-k5 shown in FIG. 2) appear in the plot.

In the graph shown in FIG. 2, when the value of the similarity f (D) at the minimum value kmin is significantly lower than the values of similarity f (D) corresponding to the local minimum values k1 to k5, the reliability flag is likely to be ON. The reliability point calculation unit 112 uses an average value fa of the similarity values f (D) corresponding to a plurality of local minimum values k1 to k5, and the similarity fmin at the minimum value kmin, to calculate a value Fr=|fmin−fa|. Then, the reliability point calculation unit 112 determines that the reliability flag is ON when the FR value is a predetermined value or more, and determines that the reliability flag is OFF when the FR value is less than the predetermined value. The reliability point calculation unit 112 calculates the number of pixel regions in which each of the reliability flag is ON, to be the reliability point R.

The reliability point calculation unit 112 calculates an evaluation value R expressed in the following equation (1) using the parallax point P and the reliability point R, and outputs the calculated value to the determination unit 123.

$$E=R/P \qquad (1)$$

Figure 3A:
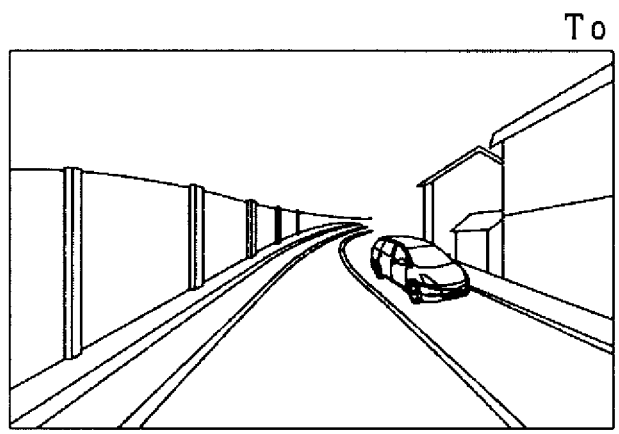
FIG. 3A is a standard image To where no obstacles are captured.
Figure 3B:
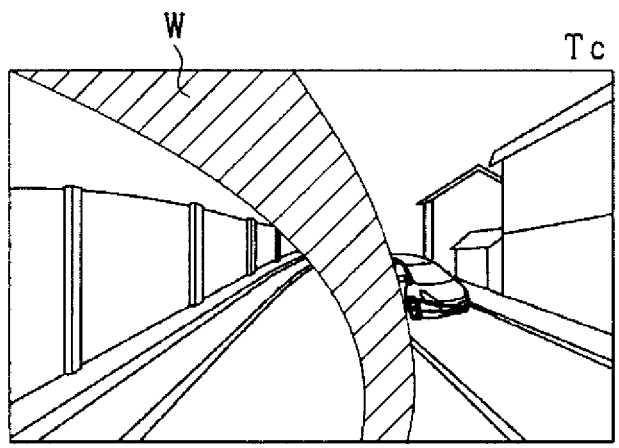
FIG. 3B is a reference image Tc where an obstacle is captured.

In the case where an obstacle such as a windshield wiper is captured in the image, the value of the reliability point R in a pixel region covered by the obstacle becomes small. For example, in FIG. 3A, a windshield wiper is not captured in the standard image To, but as shown in FIG. 3B, when a wiper area W is captured in the reference image Tc, the recognition reliability R becomes low in a pixel region in the wiper area W shown in FIG. 3B. In such a case, when a value (R/Pall) where the reliability point R is divided by total number of pixels Pall as an evaluation value, the evaluation value becomes significantly small.

In this respect, according to the present embodiment, the evaluation value calculation unit 122 calculates an evaluation value E shown in the above-described equation (1). When considering cases shown in FIGS. 3A and 3B, since the pixel region for calculating the parallax cannot be found in a pixel region included in the wiper area W shown in FIG. 3B, the parallax point P becomes small by an amount of pixel region included in the wiper area W. Moreover, in the pixel region included in the wiper area W shown in FIG. 3B, the luminance is low so that the recognition reliability is decreased. Hence, since the pixel region included in the wiper are W cannot be used for the matching process, the reliability point R becomes small by an amount of pixel region included in the wiper area W. Both of the reliability point R and the parallax point P become small so that the evaluation value E is not so small.

The threshold calculation unit 121 calculates a first threshold X1 and a second threshold X2 based on the illuminance data, and outputs the calculated thresholds to the determination unit 123. The evaluation value E varies depending on illuminance of the imaging environment (index of brightness) so that the thresholds X1 and X2 may preferably be changed appropriately depending on the illuminance of the imaging environment. In a bright environment, the evaluation value E increases as whole, and in a dark environment, the evaluation value E decreases as a whole. The threshold calculation unit 121 calculates the threshold X1 and the threshold X2 based on the acquired luminance 102. Therefore, the thresholds X1 and X2 can be set to be relatively high values when the luminance is high, and can be set to be relatively low values when the illuminance is low.

For example, when the vehicle is running in a dark environment, e.g., in night time, and enters a bright environment such as a city area, the illuminance of the imaging environment significantly increases. On the other hand, when the vehicle running in a bright environment, e.g., in daytime, enters a dark environment such as a tunnel, the illuminance of the imaging environment significantly decreases. The threshold calculation unit 121 may be configured to re-calculate the threshold X1 and threshold X2, when such a change in the illuminance is detected.

The determination unit 123 determines whether or not the imaging environment is deteriorated. When the determination unit 123 determines that the imaging environment does not become worse, the determination unit 123 commands the image processing unit 140 to perform an image processing. The determination unit 123 can be configured to determine a degree of degradation of the imaging environment. For example, the determination unit 123 may issue an alert or send a stop command to stop the driving control when it is determined that the degree of degradation of the imaging environment is large, and the determination unit 123 may command the image processing unit 140 to perform an image processing.

The image processing unit 140 performs an image processing by using a parallax value received from the parallax point calculation unit 111, a parallax image and a captured image, and outputs the image data and the control signals to the display unit 162 and the driving control unit 163 of the external apparatus 160.

FIG. 4 is a flowchart showing a calculation process executed by the vicinity supervising device 10, as a part of the vicinity supervising method executed by the vicinity supervising device 10. The image capturing unit 100 executes an image capturing step (step S101) to capture a pair of analog images To and Tc and converts the captured image to digital image. The environment acquiring unit 102 acquires (step S101) illuminance data measured by the environment measuring unit 23 and converts the acquired luminance data to digital data.

The matching processing unit 110 executes a matching processing step (step S102). Specifically, the parallax point calculation unit 111 calculates the parallax point P and the reliability point calculation unit 112 calculates a reliability point R (step S102).

The evaluation unit 120 executes evaluation steps (step S103 to step S124). Specifically, the evaluation value calculation unit 122 calculates an evaluation value E based on the above-described equation (1) using the parallax point P and the reliability point R (step S102). The threshold calculation unit 121 calculates the first threshold X1 and the second threshold X2 (step S103) based on the illuminance data acquired at step S101.

The determination unit 123 determines, using the evaluation value E, the threshold X1 and the threshold X2, whether the imaging environment is deteriorated or not (step S104, step S106) and categorizes the degree of deterioration of the imaging environment into two levels, that is, an environment level 1 and an environment level 2. The environment level 1 has a relatively low degree of deterioration and corresponds to a first level which is capable of performing an imaging process. The environment level 2 has a relatively high degree of deterioration and corresponds to a second level in which an imaging process is unable to be performed.

The categorizing or cancelling of the environment level 1 is immediately executed by a magnitude comparison between the evaluation value E and the threshold X1. The categorizing or cancelling of the environment level 2 is executed by both of a magnitude comparison between the evaluation value E and the threshold X2, and a comparison between a count number b, a count number g and thresholds Y1 and Y2. The thresholds Y1 and Y2 are stored in advance, in the vicinity supervising device 10.

The determination unit 123 compares the evaluation value E and the threshold X1 (step S104), and determines the imaging environment to be the environment level 1 when a condition E<X1 is met (step S105) and categorizes the imaging environment as the environment level 1. The determination unit 123 determines that the imaging environment is not deteriorated when a condition E>=X1 is met, cancels the category of the environment level 1 when the current category has been set as the environment level 1 (step S111), and commands the image processing unit 140 to perform an image processing (step S131).

After setting the environment level 1 at step S105, the determination unit 123 compares the evaluation value E and the threshold 2 (step S106) and updates the count number, that is, b=b+1 (step S107). Moreover, at step S108, the determination unit 123 sets the environment level 2 when the count number b satisfies a condition b>=Y1 (step S109). When the environment level 2 is set, since the image processing is unable to be performed, the determination unit 123 commands, without commanding the image processing unit to perform an image processing, the notification unit 161 and the driving control unit 163 to issue an abnormality alert and stop the driving control, respectively (step S131), and terminates the process.

In other words, the determination unit 123 determines the degree of deterioration of the imaging environment to be the environment level 2 when the evaluation value E that satisfies a condition of E<2 is acquired by a predetermined number of data, after the degree of deterioration of the imaging environment is determined as the environment level 1. In this case, the determination unit 123 commands, without commanding the image processing unit to perform image processing, the notification unit 161 and the driving control unit 163 to issue an abnormality alert and stop the driving control, respectively (step S131), and terminates the process.

At step S106, when a condition of E>=X2 is satisfied, the process proceeds to step S121 and the determination unit 123 determines whether the degree of deterioration of the imaging environment has been set as the environment level 2. When the degree of deterioration has been set as the environment level 2, the determination unit 123 increments the counter number, i.e., g=g+1 (step S122), and proceeds to step S123. At step S123, the determination unit 123 cancels the setting of the environment level 2 when a condition of the counter number g, i.e., g>=Y2 is satisfied (step S124), and commands the image processing unit 140 to perform an image processing (step S131).

When the count number g is g<Y2, the determination unit 123 terminates the calculation process without cancelling the setting of the environment level 2. At step S121, when the environment level 2 has not been set, the determination unit 123 commands the image processing unit 140 to perform image processing (step S131).

In other words, the determination unit 123 cancels the setting of the environment level 2, when the evaluation value E that satisfies a condition of E>=X2 is acquired by a predetermined number of data, after the degree of deterioration of the imaging environment is determined as the environment level 2.

As described, according to the present embodiment, the following effects can be obtained.

The evaluation calculation unit 122 calculates the evaluation value E based on the above-described equation (1). Accordingly, the evaluation value E can be prevented from being excessively small even in a case where the luminance is significantly lowered only in a part of pixel regions because an obstacle is captured or the like, so that the number of pixel regions having high recognition reliability decreases thereby lowering the reliability point R. As a result, in the case where the luminance is significantly lowered only in a part of pixel regions but the vicinity environment can be recognized, the determination unit 123 can avoid an erroneous determination where imaging environment is deteriorated, thus prevents the vicinity supervising apparatus from causing termination of an image processing or a vehicle control.

The threshold calculation unit 121 calculates the thresholds X1 and X2 based on illuminance of a plurality of images captured by the imaging units 21 and 22, whereby appropriate thresholds X1 and X2 can be calculated depending on the evaluation value E which varies in accordance with the brightness of the imaging environment. As a result, inappropriate termination of the image processing or vehicle control by the vicinity supervising device can be avoided.

The determination unit 123 determines the degree of deterioration of the imaging environment to be the second level (environment level 2) under a condition where an evaluation value E that satisfies a condition of E<X2 is acquired by a predetermined amount of data, after the degree of deterioration of imaging environment is determined as a first level. Accordingly, even in the case where an imaging environment is temporarily deteriorated, the vicinity environment can be prevented from inappropriately terminating image processing or vehicle control.

The determination unit 123, after determining the degree of deterioration of the imaging environment to be a second level (environment 2), cancels the setting of the second level (environment level 2) under a condition where an evaluation value E that satisfies a condition of E>=X2 is acquired by a predetermined amount of data. Hence, even in the case where the imaging environment is temporarily improved, the vicinity supervising device can be prevented from malfunctioning and can appropriately execute the image processing or vehicle control.

According to the above-described embodiment, a vicinity supervising device without including a notification unit, a display unit, a driving control apparatus or the like has been exemplified. However, it is not limited thereto. The vicinity supervising device may include the above-mentioned units or apparatuses, or may integrate them.

The evaluation value calculation unit 122 may calculate an evaluation value where the reliability point R is divided by total number of pixels Pall, that is, E2=R/Pall as a second evaluation value. Further, the determination unit 123 may determine the degree of deterioration of the imaging environment using both of the evaluation value E expressed by the above-described equation (1) and the second evaluation value E2. The determination unit 123 may also execute the evaluation using the second evaluation value E2, thereby precisely detecting a case where a deterioration of imaging environment influences whole image. As a result, it is avoided that the vicinity supervising device malfunctions so that an image processing or a vehicle control is executed inappropriately.

What is claimed is:

1. A vicinity supervising device comprising:
an image capturing unit that captures a plurality of images in which an object is simultaneously captured from different locations;
a matching processing unit that calculates a parallax point and a reliability point, the parallax point being a number of pixel regions from which a parallax is calculated among a plurality of pixel regions divided by the plurality of images, and the reliability point being the number of pixel regions having high recognition reliability among the plurality of pixel regions; and
an evaluation unit that evaluates, based on the parallax point and the reliability point, an imaging environment where the plurality of images are captured, wherein
the evaluation unit includes:
an evaluation value calculation unit that calculates an evaluation value based on the following equation using the parallax point and the reliability point,
a threshold calculation unit that calculates a threshold used for evaluating the evaluation value; and
a determination unit that determines whether or not the imaging environment is deteriorated when a condition where the evaluation value is less than the threshold is met, wherein the evaluation value is given by $$E=R/P \qquad (1),$$

where E represents the evaluation value, R represents the reliability point, and P represents the parallax point.

2. The vicinity supervising device according to claim 1, wherein
the threshold calculation unit calculates a first threshold and a second threshold which is smaller than the first threshold;
the determination unit is configured to
determine a degree of deterioration of the imaging environment to be a first level which is capable of performing an imaging process, when a condition where the evaluation value is less than the first threshold is met, and
determine the degree of deterioration of the imaging environment to be a second level which is unable to perform the imaging process, when a condition is satisfied in which the evaluation value is less than the second threshold judged based on at least a predetermined amount of data, after the degree of deterioration of the imaging environment is determined as the first level.

3. The vicinity supervising device according to claim 2, wherein
the determination unit is configured to determine the degree of deterioration of the imaging environment to be the second level, when a condition is satisfied in which the evaluation value is larger than or equal to the second threshold judged based on at least a predetermined amount of data, after the degree of deterioration of the imaging environment is determined as the second level.

4. The vicinity supervising device according to claim 1, wherein
the threshold calculation unit is configured to calculate the threshold based on illuminance of the plurality of images.

5. A method for supervising a vicinity of a vehicle comprising steps of:
an image capturing step that captures a plurality of images in which an object is simultaneously captured at different locations;
a matching processing step that calculates a parallax point and a reliability point, the parallax point being a number of pixel regions from which a parallax is calculated among a plurality of pixel regions divided by the plurality of images, and the reliability point being the number of pixel regions having high recognition reliability among the plurality of pixel regions; and
an evaluation step that evaluates, based on the parallax point and the reliability point, an imaging environment where the plurality of images are captured, wherein
the evaluation step includes:
an evaluation value calculation step that calculates an evaluation value based on the following equation using the parallax point and the reliability point;
a threshold calculation step that calculates a threshold used for evaluating the evaluation value; and
a determination step that determines whether or not the imaging environment is deteriorated when a condition where the evaluation value is less than the threshold is met, wherein the evaluation value is given by $$E=R/P \qquad (1),$$

where E represents the evaluation value, R represents the reliability point, and P represents the parallax point.

6. A non-transitory computer-readable medium having computer-executable instructions for supervising a vicinity of a vehicle, the computer-executable instructions comprising instructions for:
capturing a plurality of images in which an object is simultaneously captured from different locations;
calculating a parallax point and a reliability point, the parallax point being a number of pixel regions from which a parallax is calculated among a plurality of pixel regions divided by the plurality of images, and the reliability point being the number of pixel regions having high recognition reliability among the plurality of pixel regions; and
evaluating, based on the parallax point and the reliability point, an imaging environment where the plurality of images are captured, wherein
evaluating the imaging environment includes:
calculating an evaluation value based on the following equation using the parallax point and the reliability point;
calculating a threshold used for evaluating the evaluation value; and
determining whether or not the imaging environment is deteriorated when a condition where the evaluation value is less than the threshold is met, wherein the evaluation value is given by $$E=R/P \qquad (1),$$

where E represents the evaluation value, R represents the reliability point, and P represents the parallax point.

* * * * *